Feb. 17, 1970    H. HEIDER ET AL    3,496,441
D.C. MOTOR CONTROL CIRCUIT
Filed Oct. 3, 1966    2 Sheets-Sheet 1

Inventors:
Helmut Heider
Helmut Looss
Friedrich-Wilhelm Langhoff
By: Spencer & Kaye
Attorneys Inventors:
Helmut Heider
Helmut Looss
Friedrich-Wilhelm Langhoff
By: Spencer & Kaye
Attorneys

United States Patent Office 3,496,441
Patented Feb. 17, 1970

3,496,441
D.C. MOTOR CONTROL CIRCUIT
Helmut Heider, Helmut Looss, and Friedrich-Wilhelm Langhoff, Hamburg, Germany, assignors to Licentia Patent-Verwaltungs—G.m.b.H., Frankfurt am Main, Germany
Filed Oct. 3, 1966, Ser. No. 583,770
Claims priority, application Germany, Oct. 5, 1965,
L 51,797
Int. Cl. H02p 5/16
U.S. Cl. 318—257         7 Claims

ABSTRACT OF THE DISCLOSURE

A circuit arrangement for the continuous control of a direct current motor includes a bridge circuit having four paths, a transistor switch connected in each of two adjacent paths, a transistor serving as a variable resistance connected in each of the other two paths, a direct current motor connected between the terminals joining the switch transistors and the resistance transistors, a potential source connected between the terminal between the two switches and the terminal between the two variable resistances, and means for supplying a continuous control signal to the base of the said transistors.

---

The present invention relates to a circuit arrangement for the continuous control of a direct current motor. More particularly, the present invention relates to a circuit arrangement for the continuous control of a direct current motor capable of rotating in opposite directions and being energized from a single voltage source.

There exist circuits wherein direct current motors are controlled in a bridge circuit arrangement by means of a single voltage source, permitting the motor to rotate in two rotational directions. Such prior art circuits conventionally use rectifiers operating as controllable semiconductors. The rectifiers are arranged in the four bridge paths and open or close in pairs. This brings about a reversal of polarity of the applied voltage on the terminals of the motor so that the motor can be driven in either rotational direction. If a trigger circuit is used for controlling the switches, the conventional circuit arrangement thereby operates in the manner of a three-point switch.

Another prior art arrangement for controlling the rotational speed of a direct current motor using a bridge circuit utilizes switches operated with a constant keying frequency. In this arrangement, the ratio of the closing time to the opening time of the switches is proportional to the input voltage applied to an amplifier operating at the keying frequency. Such an arrangement provides a quasi-continuous amplifier arrangement. The amplifier output voltage is proportional to the input voltage so that the rotational speed of the direct current motor may be changed by changing the input voltage. The momentary value of the output voltage can thus move between the null or zero position and the full or maximum amplitude of the energizing voltage. That is, the actual value of the output voltage of the amplifier is switched between either zero or full amplitude.

The use of the three-point switches as a quasi-continuous amplifier has additional disadvantages for use as regulators since they have undesired dead time. With a quasi-continuous amplifier, the corresponding dead time is inversely proportional to the keying frequency.

It is accordingly an object of the present invention to overcome the above described disadvantages for controlling the rotational speed of a direct current motor.

A second object of the present invention is to provide a new and improved circuit arrangement for continuously controlling the rotational speed of a direct current motor.

A further object of the present invention is to provide a new and improved circuit arrangement for continuously controlling the rotational speed of a direct current motor which is energized from a single potential source and is arranged in a bridge circuit.

Still another object of the present invention is to provide a new and improved circuit arrangement for controlling direct current motors using transistors arranged as switches and as vaiable resistors in a bridge circuit.

With the above objects in view, the present invention resides in a circuit arrangement for continuously controlling a direct current motor. The circuit includes a bridge circuit having first, second, third and fourth terminals. A first switch is connected between the first and second terminals. A second switch is connected between the first and fourth terminals, each of the switches being operable between a circuit closed condition and a circuit open condition. A first variable resistor is connected between the second and third terminals of the bridge circuit while a second variable resistor is connected between the third and fourth terminals. Each of the resistors is variable between a substantially zero resistance and a substantially infinite resistance. The second and fourth terminals of the bridge circuit are adapted to have a motor connected thereacross and the first and third terminals are adapted to have a source of operating potential applied thereacross. When the motor and potential source are so connected, the operation of one of the switches into circuit closed condition causes current to flow from the potential source through the motor and one of the variable resistors, the other of the variable resistors having a substantially infinite resistance. The direction of rotation of the motor is dependent upon which of the switches is in its circuit closed condition. The rotational speed of the motor is dependent upon the resistance value of the variable resistor through which the motor current flows.

Additional objects and advantages of the present invention will become apparent upon consideration of the following description when taken in conjunction with the accompanying drawings in which.

Figure 1:
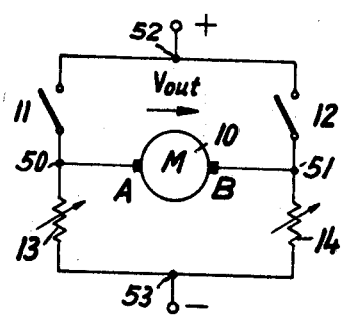
FIGURE 1 is a schematic diagram of the basic bridge circuit constructed in accordance with the principles of the present invention.

Referring now to the drawings, and more particularly to FIGURE 1, there is shown a direct current motor 10 having brushes or terminals A and B. The terminals A and B of the motor 10 are respectively connected to two terminals 50 and 51 of a bridge circuit. The remaining terminals of the bridge circuit are the terminals 52 and 53. Terminals 52, 50, 53 and 51 may be considered the first, second, third and fourth terminals, respectively, of the bridge circuit.

The motor 10 is connected across one diagonal of the bridge circuit. Connected across the other diagonal, namely terminals 52 and 53, is a source of direct current potential (illustrated symbolically only) having its positive terminal connected to terminal 52 and its negative terminal connected to terminal 53.

Arranged between the terminals 52 and 50 of the bridge circuit 10 is a switch 11 while a second switch 12 is arranged between the terminals 52 and 51. The remaining bridge circuit elements are a variable resistor 13 connected between terminals 50 and 53 of the bridge and a variable resistor 14 connected between terminals 51 and 53 of the bridge.

In operation, one of the switches 11 and 12 is closed while the other remains open, depending on the desired direction of rotation of motor 10. If both switches are open, as illustrated, the variable resistors 13 and 14 have the effective value of infinity, that is, a substantially infinite resistance.

If the switch 12 is closed, for example, current flows from the terminal 52 through the closed switch 12, the terminal B of the motor 10, out through the terminal A and through the variable resistor 13 through the terminal 53 of the bridge and the voltage source. It is clear that the resistance of the variable resistor 13 may be varied to provide the desired value of the motor current and therewith the desired rotational speed of the motor 10. With the above described conditions, the variable resistor 14 again has a substantially infinite resistance.

With the reverse connections, namely with the switch 12 open and the switch 11 closed, current will flow into the terminal A of the motor 10, out from the terminal B and through the variable resistor 14 to the terminal 53. In this connection, the resistance of the resistor 14 will determine the value or magnitude of the motor current and thereby the rotational speed of the motor.

Figure 2:
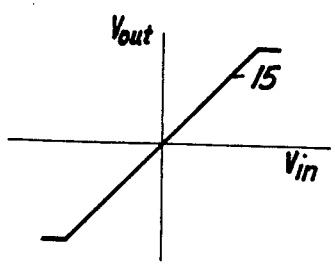
FIGURE 2 is a graphical representation of the desired characteristic of a continuous amplifier that may be used for the regulation of the motor.

For proper regulation purposes, it is best to apply a voltage to the motor 10 which varies proportionally with a desired control characteristic; this is shown in FIGURE 2 which illustrates an ideal characteristic 15. In FIGURE 2, the characteristic 15 indicates that the voltage ($V_{in}$) applied across the terminals A–B of the motor 10 is directly proportional to the frequency of rotation of the motor, $V_{out}=f(V_{in})$.

Figure 3:
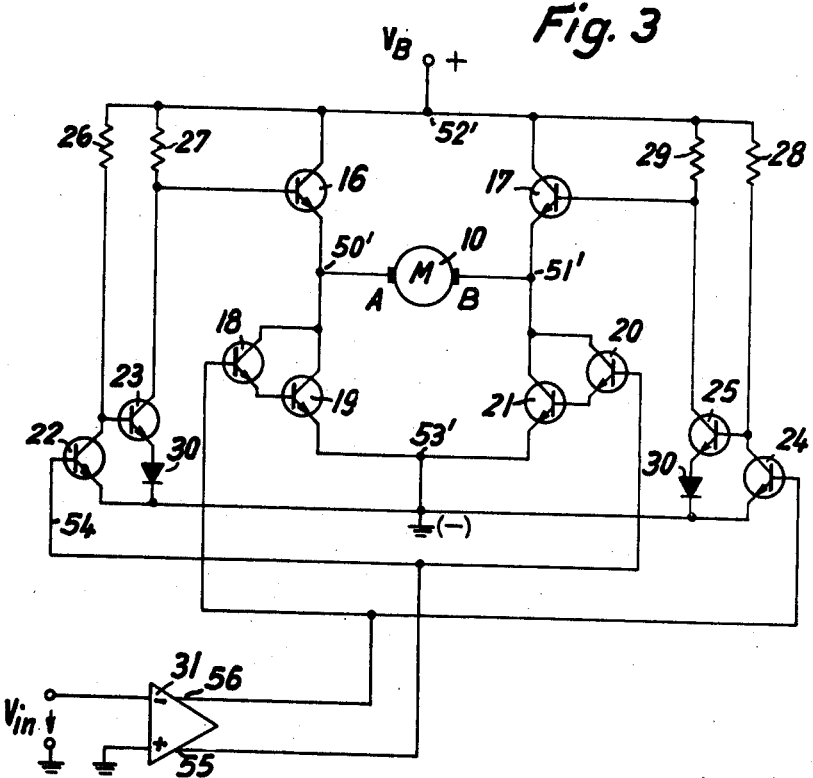
FIGURE 3 is an electrical schematic diagram arranged in accordance with the principles of the present invention using transistors.

Referring now to FIGURE 3, an electrical schematic diagram is shown wherein transistors are used in place of both the switches and the adjustable resistors of FIGURE 1. The motor 10 is again shown arranged between two terminals 50' and 51' of the bridge. Connected across the remaining two terminals of the bridge 52' and 53' are the poles of the direct current power supply (not illustrated). Connected between the terminal 52' of the bridge and the terminal 50' is a transistor 16, while a second transistor 17 is connected between the terminals 52' and 51'.

Connected in cascade between the terminals 50' and 53' are transistors 18 and 19 while transistors 20 and 21 are similarly connected in cascade between the terminals 51' and 53' of the bridge arrangement. The transistors 16 and 17 can be considered switching transistors while the transistors 18, 19, 20 and 21 are power transistors respectively replacing the resistors 13 and 14 of FIGURE 1.

Additional transistors 22, 23, and 24, 25 are provided for reversing the reference potential applied to the motor as will be subsequently described. The transistors 22 and 23 are connected in cascade between the positive pole of the direct current power supply 52 by means of resistors 26 and 27, the base of the transistor 22 being connected by conductor 54 to one output terminal 55 of a push-pull amplifier 31. The transistors 24 and 25 are similarly connected in cascade between the terminal 52' by means of resistors 28 and 29 and the output terminal 56 of the amplifier 31. The rectifiers 30 show a small forward voltage drop. This helps to maintain the transistors 23 and 25 in cutoff condition while the transistors 22 and 24, respectively, conduct.

The push-pull amplifier 31 provides equal and opposite voltages at its respective output terminals 55 and 56. It can be seen that the terminal 55 of the amplifier 31 is also connected to the base of the transistor 20 while the terminal 56 is connected to the base of the transistor 18.

The push-pull amplifier 31 is used for controlling the operation of the motor 10 and has an amplification factor $K=1$.

In operation, when the input voltage $V_{in}$ applied to the amplifier 31 equals 0, the output voltage appearing at the terminals 55 and 56 will also be 0. Under these conditions, the transistors 16, 17, 18, 19, 20, 21, 22 and 24 will be cut off and no current will flow through the motor 10.

For a negative output voltage appearing at the output terminal 56, the transistors 18, 19, 24 and 17 will remain cut off. That is, it should be noted that all of the transistors used in the circuit arrangement of FIGURE 3 are n-p-n transistors. Thus, a negative voltage applied to the pase of such a transistor will maintain the transistor in cutoff condition.

Since the voltage appearing at the terminal 55 will be positive, when the voltage at the terminal 56 is negative, the transistors 20, 21, 22 and 16 will remain cut off until the amplitude of the voltage at the terminal 55 reaches the base-emitted threshold voltage of the transistor 22. It is noted that this voltage is applied to the base of the transistor 22 by means of the conductor 54. Transistor 22 will start conducting, thereby cutting off the transistor 23. This will place the transistor 16 in conductive condition. Current will now flow from the terminal 52' through the conducting transistor 16 to the terminal A of the motor 10, out through the terminal B and through the transistors 21 and 20 to the ground or negative terminal 53'. That is, the current will flow through the motor 10 and through transistors 20 and 21 when the voltage appearing at the terminal 55 also exceeds the base-emitter threshold voltage of the transistors 20 and 21 connected in cascade. From this point on, the current through the motor 10 can be continuously controlled from zero to its maximum value.

If the polarity of the voltage applied to the amplifier 31 is negative, then the voltage appearing at the terminal 55 will be negative and the voltage appearing at the terminal 56 will be positive. Thus, the transistors 22, 16, 20 and 21 will be in cutoff condition and the transistors 18, 19, 17, 24 and 25 will be in conductive condition in the same manner as described with respect to the above reverse conditions. With this arrangement, the current in the motor 10 will now flow from the terminal B to the terminal A and the rotational direction of the motor 10 will now be reversed from its previous direction. Nevertheless, the rotational speed of the motor 10 will still be continuously controlled and the current through the motor can vary under these continuously controlled conditions from zero current to the maximum possible value.

Figure 4:
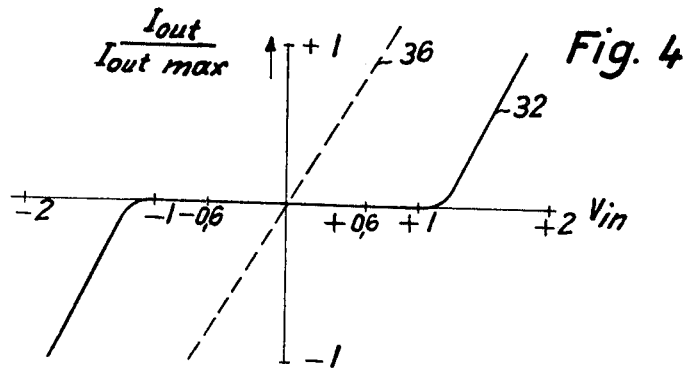
FIGURE 4 shows the control characteristics of the power transistors used in the circuit arrangement of FIGURES 3 and 5.

Referring now to FIGURE 4, the control characteristic is shown by the line 32. That is, the line 32 is a plot of the current $I_{out}$ through the motor versus the voltage $V_{in}$ applied to the input of the push-pull amplifier 31.

It can be seen that the characteristic is not linear until the threshold voltage of the transistors 18, 19, 20 and 21 have been exceeded. The linearity of the control characteristic 32 can be improved if the motor current is used for feedback purposes. This may best be seen with respect to the arrangement in FIGURE 5.

Figure 5:
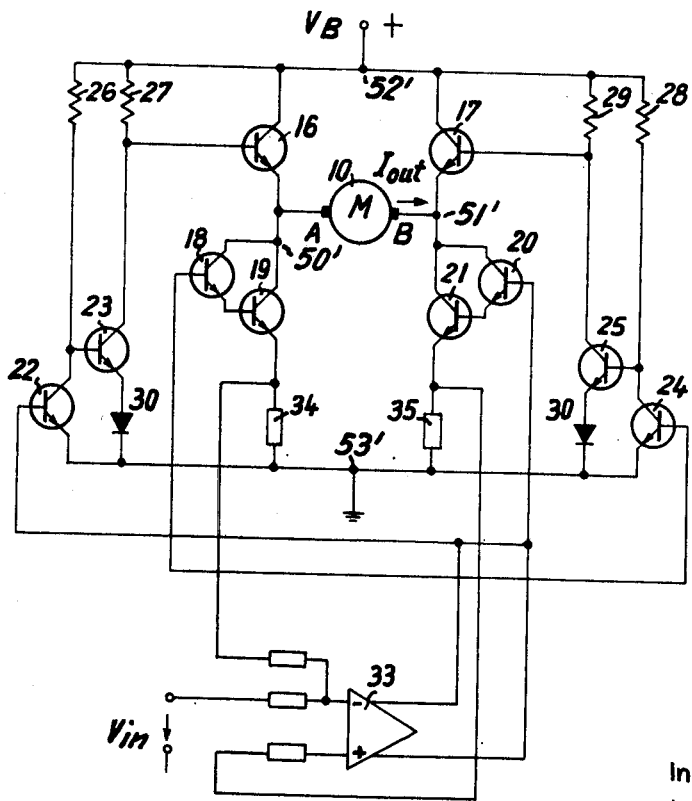
FIGURE 5 is an electrical schematic drawing similar to FIGURE 3 but having additional current regulation.

In FIGURE 5, the elements of the circuit having the same function as the elements in FIGURE 3 have corresponding numerals. In place of the amplifier 31 of FIGURE 4, an amplifier 33 is provided. Additional resistors 34 and 35 are also provided. That is, the resistor 34 is connected between the collector of the transistor 19 and the bridge terminal 53' while the resistor 35 is connected between the collector of the transistor 21 and the terminal 53'.

The amplifier 33 has an amplification factor which is many times larger than 1, as distinct from the amplifier 31 of FIGURE 3. In the arrangement of FIGURE 5, it can be seen that the motor current coming from the motor 10 is fed from the junction of the resistor 34 and transistor 19 to one input terminal of the amplifier 33 while, for motor current flow in the opposite direction, the junction between the resistor 35 and the transistor 21 is applied to the other input terminal of the amplifier 33.

In operation, if a current characterized by a large internal resistance is desired, then a corresponding ideal value current is fed back to the input terminals of the amplifier 33. As pointed out above, this can be obtained from the shunt resistor 34 or 35.

With the arrangement shown in FIGURE 5, the threshold value for the circuit arrangement drops to only a fractional portion of the threshold voltage of the transistors 18 and 19 or 20 and 21 and actually becomes negligible. Thus, the control characteristic line now becomes linear and this is shown in FIGURE 4 by the dashed line 36.

From the above, it can be seen that the circuit arrangement, according to the principles of the present invention, overcome the disadvantages of the prior art circuits and provides continuous control of the rotational speed of a direct current motor in both of its rotational directions. This circuit also has a higher degree of control and a better dynamic characteristic. It can be seen that the n-p-n transistors have been used in place of the variable resistors of FIGURE 1. It is to be appreciated that p-n-p types of transistors may also be used with appropriate correction of the polarities of the applied voltages. It can further be seen that, with the above arrangement, the transistors such as 16 and 17 operate as switches while the transistors such as 18, 19, 20 and 21 may be power transistors and operate as adjustable resistors.

The switching transistors 16 and 17 are either in conducting or non-conducting condition depending upon the polarity of the voltage applied to the push-pull amplifier 31 as long as the threshold value of these transistors has been reached. For safety's sake, the threshold voltage of the switching transistors 16 and 17 should be smaller than the threshold voltages of the power transistors 18–21. The power or load transistors are either cut off or conducting by the magnitude of voltage applied thereto. The magnitude of the input voltage applied to the push-pull amplifier 31 or 33 controls the amount that the appropriate power transistor conducts and in this way produces the desired motor current and the correspondingly desired rotational speed of the motor.

As pointed out above, the control characteristic of a power transistor is generally not linear since, in order to control the transistor, the threshold voltage must first be reached. In this way, then, a dead zone for controlling the transistors may exist in the transition between the positive and negative rotational directions of the motor. As also pointed out above, the linearity of the control characteristic can be improved and the dead zone can be substantially eliminated in accordance with the principles of the present invention by feeding back the current flowing through the motor to the input of the amplifier for each rotational direction of the direct current motor. In this way, the current through the motor is proportional to the input voltage applied to the push-pull amplifier and the dead zone is inversely proportional to the amplification factor of the amplifier.

It will be understood that the above description of the present invention is susceptible to various modifications, changes and adaptations, and the same are intended to be comprehended within the meaning and range of equivalents of the appended claims.

What is claimed is:
1. A circuit arrangement for the continuous control of a direct current motor, comprising in combination:
 (a) a bridge circuit having first, second, third and fourth terminals;
 (b) a first transistor switch connected between said first terminal and said second terminal;
 (c) a second transistor switch connected between said first terminal and said fourth terminal, each of said switches being operable between a circuit closed condition and a circuit open condition;
 (d) a first variable resistance means comprising a transistor connected between said second terminal and said third terminal of said bridge circuit;
 (e) a second variable resistance means comprising a transistor connected between said third terminal and said fourth terminal of said bridge circuit, each of said resistors being variable between a substantially zero resistance and a substantially infinite resistance, said second and fourth terminals being adapted to have the motor connected thereacross and said first and third terminals being adapted to have a source of operating potential connected thereacross, whereby when said motor and said potential source are so connected, the operation of one of said switches into circuit closed condition causes current to flow from said potential source through said motor and one of said variable resistors, the other of said variable resistors having a substantially infinite resistance, the direction of rotation of said motor being dependent upon which of said switches is in its circuit closed condition and the rotational speed of said motor being dependent upon the resistance value of said one of said variable resistors; and
 (f) means for supplying a continuous control signal to the base of said transistors.

2. A circuit arrangement in accordance with claim 1 wherein said means for supplying a continuous control signal is a push-pull amplifier.

3. A circuit arrangement in accordance with claim 1 wherein means are provided for feeding back the current flowing through the motor to the input of said means for supplying a control signal.

4. A circuit according to claim 1 in which each of said transistor switches consists of a single transistor arranged between the respective terminals, and each of said transistor resistance means comprise a plurality of transistors connected in cascade.

5. A circuit in accordance with claim 1 including a D.C. motor connected across said second and fourth terminals, and a source of potential connected across said first and third terminals.

6. A circuit arrangement in accordance with claim 1 including rectifier means connected between the base of each of said first transistor switch and second transistor switch and the source of operating potential for the motor.

7. A circuit in accordance with claim 6 including resistor means connected between the base of each of said transistor switches and the source of operating potential for said motor.

References Cited

UNITED STATES PATENTS

| 2,590,104 | 3/1952 | King. | |
|---|---|---|---|
| 3,110,851 | 11/1963 | Plogstedt et al. | 318—294 |
| 3,137,809 | 6/1964 | Freiberg | 318—293 |
| 3,378,699 | 4/1968 | Bruinsma | 318—293 |
| 2,972,710 | 2/1961 | D'Amico. | |
| 3,344,331 | 9/1967 | Adler et al. | |
| 3,370,224 | 2/1968 | Merrell et al. | |
| 3,250,991 | 5/1966 | Beeston. | |

ORIS L. RADER, Primary Examiner
K. L. CROSSON, Assistant Examiner

U.S. Cl. X.R.
318—294; 323—75